(12) United States Patent
Lim

(10) Patent No.: US 9,454,496 B2
(45) Date of Patent: Sep. 27, 2016

(54) MEMORY SYSTEM

(71) Applicant: SAMSUNG ELECTRONICS CO., LTD., Suwon-si (KR)

(72) Inventor: Sun-Young Lim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 14/185,143

(22) Filed: Feb. 20, 2014

(65) Prior Publication Data

US 2014/0281286 A1 Sep. 18, 2014

(30) Foreign Application Priority Data

Mar. 14, 2013 (KR) .................... 10-2013-0027449

(51) Int. Cl.
| | |
|---|---|
| *G06F 13/12* | (2006.01) |
| *G06F 13/38* | (2006.01) |
| *G06F 12/14* | (2006.01) |
| *G06F 12/10* | (2016.01) |

(52) U.S. Cl.
CPC ......... *G06F 12/145* (2013.01); *G06F 12/1027* (2013.01); *G06F 2212/651* (2013.01)

(58) Field of Classification Search
None
See application file for complete search history.

(56) References Cited

U.S. PATENT DOCUMENTS

| | | | | |
|---|---|---|---|---|
| 5,987,582 A | * | 11/1999 | Devic ................. | G06F 12/1081 345/543 |
| 7,225,316 B2 | | 5/2007 | Thadani | |
| 7,620,793 B1 | | 11/2009 | Edmondson et al. | |
| 8,185,716 B2 | | 5/2012 | Skerlj et al. | |
| 2002/0169979 A1 | * | 11/2002 | Zimmer ................ | G06F 9/4401 726/1 |
| 2003/0131209 A1 | * | 7/2003 | Lee ....................... | G06F 12/023 711/170 |
| 2007/0233995 A1 | * | 10/2007 | Yamazaki ........... | G06F 12/0223 711/170 |
| 2010/0037024 A1 | * | 2/2010 | Brewer ............... | G06F 12/0851 711/127 |
| 2010/0306499 A1 | * | 12/2010 | Petolino, Jr. ........ | G06F 12/1027 711/207 |
| 2013/0080714 A1 | * | 3/2013 | Kegel ................. | G06F 12/1081 711/154 |

FOREIGN PATENT DOCUMENTS

| | | |
|---|---|---|
| KR | 10-2001-0101695 A | 11/2001 |
| KR | 10-2006-0120242 A | 11/2006 |
| KR | 10-2008-0108975 A | 12/2008 |
| KR | 10-2009-0026286 A | 3/2009 |
| KR | 10-2009-0097671 A | 9/2009 |
| KR | 10-2010-0018017 A | 2/2010 |
| KR | 10-2010-0132244 A | 12/2010 |
| KR | 10-1061483 B1 | 9/2011 |
| KR | 10-2012-0079682 A | 7/2012 |
| KR | 10-2012-0119092 A | 10/2012 |

* cited by examiner

*Primary Examiner* — Elias Mamo
(74) *Attorney, Agent, or Firm* — Sughrue Mion, PLLC

(57) ABSTRACT

A memory system is provided, which includes a real memory space and a virtual memory space. The memory system includes a memory device having a first memory space which is accessed using a first memory address and a second memory space which is accessed using a second memory address, and a memory controller configured to control access to the memory device; wherein the memory controller is configured to translate the first memory address into the second memory address mapped thereto in response to a request for access to the first memory space, access the second memory space using the translated second memory address, and access the second memory space using the non-translated second memory address, in response to a request for access to the second memory space.

17 Claims, 7 Drawing Sheets

ADDRESS TRANSLATION TABLE

| virtual memory address | real memory address |
|---|---|
| 0x0101 | 0x0057 |
| 0x0102 | 0x0001 |
| 0x0103 | 0x00AB |
| 0x0104 | 0x00C3 |
| ⋮ | ⋮ |

MEMORY SYSTEM

CROSS-REFERENCE TO RELATED APPLICATION

This application claims priority from Korean Patent Application No. 10-2013-0027449 filed on Mar. 14, 2013 in the Korean Intellectual Property Office, the contents of which are herein incorporated by reference, in its entirety.

BACKGROUND

1. Field

The exemplary embodiments relate to a memory system. In particular, the exemplary embodiments relate to a memory system including a real memory space and a virtual memory space, wherein a reserved area is set in the virtual memory which can only be accessed by a particular host.

2. Description of the Related Art

Memory devices are largely classified into volatile memory devices and nonvolatile memory devices. A volatile memory device is a memory device that loses stored data when disconnected from a power supply. Examples of volatile memory devices include a static random access memory (SRAM), a dynamic random access memory (DRAM) and a synchronous dynamic random access memory (SDRAM). A nonvolatile memory device is a memory device that retains stored data when disconnected from a power supply, and examples of the nonvolatile memory device include a read only memory (ROM), a programmable read only memory (PROM), an electrically programmable read only memory (EPROM), an electrically erasable programmable read only memory (EEPROM), a flash memory, a nonvolatile memory device using a resistive element (for example, a phase-change random access memory (PRAM), a ferroelectric random access memory (FRAM) or a resistive random access memory (RRAM), and so on.

SUMMARY

The exemplary embodiments provide a memory system which includes a real memory space and a virtual memory space.

The exemplary embodiments also provide a memory system which sets a reserved area in a virtual memory space which is only accessible to a particular host.

The exemplary embodiments also provide a memory system which sequentially allocates a reserved area and maps the sequential reserved area to a non-sequential region of a real memory space.

These and other objects of the exemplary embodiments will be described in or be apparent from the following description.

According to an aspect of the exemplary embodiments, a memory system is provided which includes a memory device having a first memory space configured to be accessed using a first memory address and a second memory space configured to accessed using a second memory address, and a memory controller configured to control access to the memory device, wherein the memory controller is configured to translate the first memory address into the second memory address, mapped thereto, in response to a request for access to the first memory space, and accesses the second memory space using the translated second memory address, and accesses the second memory space using the non-translated second memory address, in response to a request for access to the second memory space.

According to another aspect of the exemplary embodiments, a memory system is provided which includes a memory device configured to include a plurality of memory cells storing data, and a memory controller configured to provide to the memory device a physical address received from a host, wherein the memory controller is configured to translate the physical address at a first timing, provide the translated physical address to the memory device, and provides a non-translated physical address to the memory device at a second timing.

An aspect of the exemplary embodiments may provide a memory system including: a memory device including a first and second memory spaces, the first memory space being a virtual memory space and the second memory space being a real memory space; and a memory controller configured to access the memory device, wherein a reserved area is set in the virtual memory space and the reserved area is only accessible by an authorized host in response to a request to access the first memory space, and wherein an unauthorized host is unable to access the reserved area of the virtual memory space.

The virtual memory space may be mapped to at least a portion of the real memory space by the memory controller.

The virtual memory space may be configured to be accessed by a first memory address and the real memory space is configured to be accessed by a second memory address.

The memory controller may be configured to translate the first memory address into the second memory address and the memory controller is configured to include an address translation table in which the first memory address and the translated second memory address are configured to be related with each other.

The memory controller may be configured to access the real memory space using the translated second memory address, and access the real memory space using a non-translated second memory address, in response to a request for access to the real memory space.

BRIEF DESCRIPTION OF THE DRAWINGS

The above and other features and advantages will become more apparent by describing in detail the exemplary embodiments with reference to the attached drawings in which.

DETAILED DESCRIPTION OF THE EXEMPLARY EMBODIMENTS

Figure 1:
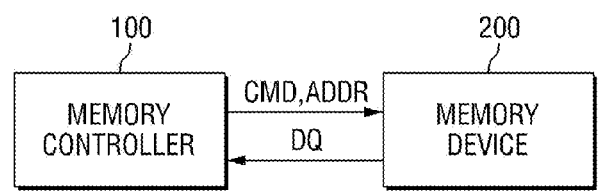
FIG. 1 is a block diagram of a memory system according to an exemplary embodiment.

The exemplary embodiments will now be described more fully hereinafter with reference to the accompanying drawings, in which exemplary embodiments are shown. This exemplary embodiments may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. The same reference numerals indicate the same components throughout the specification. In the attached figures, the thickness of layers and regions is exaggerated for purposes of clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, in response to the device in the figures being turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the exemplary embodiments and is not a limitation related to the scope of the invention unless otherwise specified. Further, unless defined otherwise, all terms defined in generally used dictionaries may not be overly interpreted.

The exemplary embodiments will be described with reference to perspective views, cross-sectional views, and/or plan views, in which preferred embodiments of the invention are shown. Thus, the profile of an exemplary view may be modified according to manufacturing techniques and/or allowances. That is, the exemplary embodiments are not intended to limit the scope of the disclosure but rather cover all changes and modifications that can be caused due to a change in a manufacturing process. Thus, regions shown in the drawings are illustrated in schematic form and the shapes of the regions are presented simply by way of illustration and not as a limitation.

Hereinafter, exemplary embodiments will be described with reference to the accompanying drawings. The following exemplary embodiments will be described with regard to a dynamic Random Access Memory (DRAM) as a memory device. However, it is obvious to one skilled in the art that the exemplary embodiments can be applied to a variety of volatile memory devices that are not illustrated herein.

FIG. 1 is a block diagram of a memory system according to an exemplary embodiment.

Referring to FIG. 1, the memory system 1 includes a memory controller 100 and a memory device 200.

The memory controller 100 is configured to control the memory device 200. The memory controller 100 may access the memory device 200 in response to a request from a host. For example, the memory controller 100 may write data to the memory device 200 or may read data from the memory device 200. To this end, the memory controller 100 may provide a command CMD, an address ADDR, and so on, to the memory device 200 and may exchange data DQ with the memory device 200. The memory controller 100 may be configured to drive firmware for controlling the memory device 200.

The memory device 200 is configured to store data. For example, the memory device 200 may be a DRAM such as a double data rate static DRAM (DDR SDRAM), a single data rate SDRAM (SDR SDRAM), a low power DDR SDRAM (LPDDR SDRAM), a low power SDR SDRAM (LPSDR SDRAM), or a direct rambus DRAM (RDRAM), or an arbitrary volatile memory device.

Figure 2:
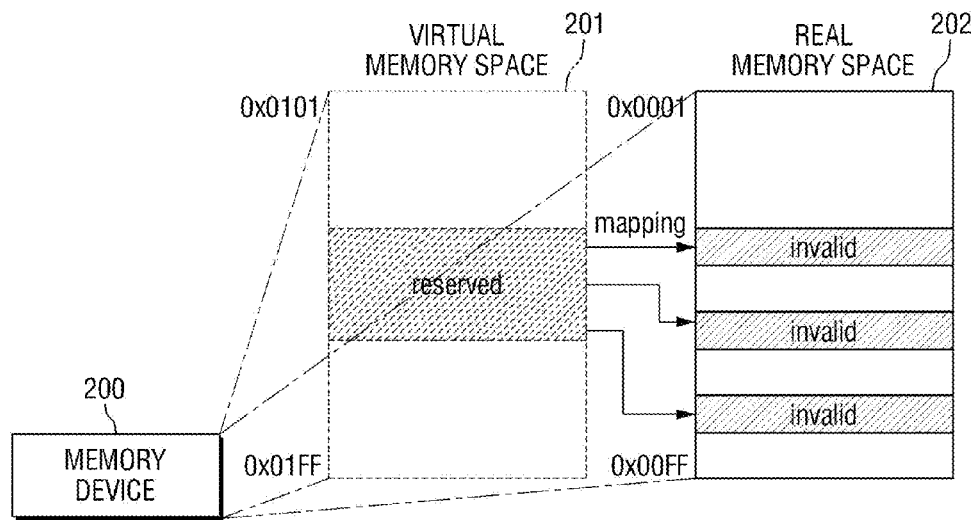
FIG. 2 illustrates a virtual memory space and a real memory space of the memory device shown in FIG. 1.

FIG. 2 illustrates a virtual memory space and a real memory space of the memory device shown in FIG. 1.

Referring to FIG. 2, the memory device 200 shown in FIG. 1 includes a virtual memory space 201 and a real memory space 202. The virtual memory space 201 is a memory space which does not actually exist in the memory device 200 and the real memory space 202 is a memory space which actually exists in the memory device 200. The real memory space 202 corresponds to a plurality of memory cells to be described later, and the virtual memory space 201 may be mapped to at least a portion of the real memory space 202. According to an exemplary embodiment, the virtual memory space 201 may be entirely mapped to the real memory space 202.

The memory device 200 may provide the entire memory space, including the virtual memory space 201 and the real memory space 202 to a host (various types of hardware devices or applications driven by the hardware devices). For example, when the virtual memory space 201 is 512 MB and the real memory space 202 is 512 MB, the entire memory space of the memory device 200 provided to the host may be 1024 MB.

The virtual memory space 201 and the real memory space 202 may provide memory addresses having different ranges. The host may access the virtual memory space 201 using a virtual memory address and may access the real memory space 202 using a real memory address. For example, the virtual memory address may have a range from 0x0101 to 0x01FF and the real memory address may have a range from 0x0001 to 0x00FF. The range of the memory address may vary in various manners according to the exemplary embodiments. The memory address may divide the memory space of the memory device 200 in units of pages.

The memory device 200 may write data to the real memory space 202 or may read data from the real memory space 202 in response to a request from the host for access to the real memory space 202. However, since the virtual memory space 201 is a memory space that does not actually exist, the host cannot actually access the virtual memory space 201. In this case, the memory device 200 may provide accessing to the real memory space 202 mapped to the virtual memory space 201 in response to a request from the host for access to the virtual memory space 201. To this end, the memory device 200 may translate the virtual memory address provided from the host into the real memory address mapped thereto.

The memory device 200 may set a reserved area in the virtual memory space 201. The reserved area may be an area allocated to a particular host to allow only the particular host to access the reserved area in the virtual memory space. For example, the particular host may be a hardware device or an application supporting a camera of a mobile system or digital rights management (DRM). Accessing of other hosts to an area of the real memory space 202 mapped to the reserved area of the virtual memory space 201 is not allowed. The area of the mapped real memory space 202 is treated as an invalid area. The memory device 200 may set the reserved area in response to the request from the particular host after it is initially booted. Alternatively, the memory device 200 may set the reserved area during a normal operation, and may later cancel the reserved area.

In mobile system of the related art, a reserved area has been set in the memory space for various uses. The reserved area which has been set may not permit other hosts to access the memory space even when the area is not used by a particular host, resulting in squandering the memory space. In particular, the reserved area may be allocated as a continuous memory address, which is problematic.

In an exemplary embodiment, the reserved area set in the virtual memory space 201 is allocated as a continuous (or linear) memory address, while the area of the real memory space 202 mapped to the reserved area is allocated as a discontinuous (or non-linear) memory address. That is to say, the memory device 200 maps the continuous reserved area of the virtual memory space 201 to the discontinuous area of the real memory space 202. In addition, only when the particular host uses the reserved area, may the reserved area of the virtual memory space 201 be mapped to the area of the real memory space 202. When the particular host does not use the reserved area, other hosts may be allowed to access the mapped area of the real memory space 202. Therefore, according to the exemplary embodiments, squandering of the memory space can be prevented, and the memory space can be efficiently used.

Figures 3, 4:
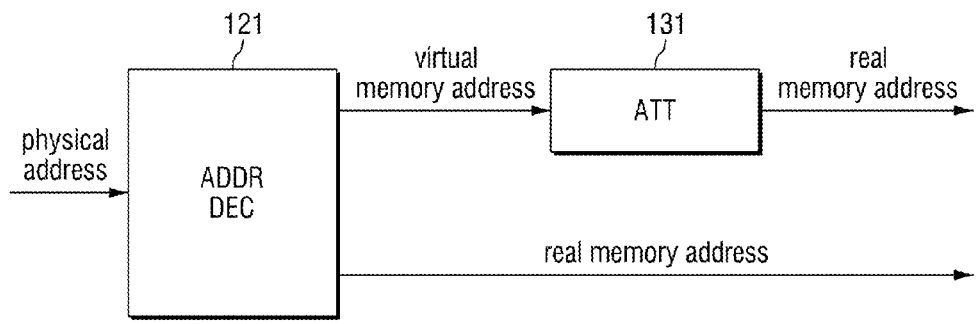
FIG. 3 illustrates an address translation structure of a memory controller shown in FIG. 1.
FIG. 4 illustrates an address translation table shown in FIG. 3.

FIG. 3 illustrates an address translation structure of a memory controller shown in FIG. 1, and FIG. 4 illustrates an address translation table 131 shown in FIG. 3.

Referring to FIG. 3, the memory controller 100 shown in FIG. 1 includes an address decoder (ADDR DEC) 121 and an address translation table (ATT) 131.

The address decoder 121 receives a physical address from the host. The physical address includes the virtual memory address and the real memory address. The address decoder 121 may determine whether the received physical address is a virtual memory address or a real memory address. When the physical address is a virtual memory address at a first timing, the address decoder 121 provides the virtual memory address to the address translation table 131 for address translation. When the physical address is a real memory address at a second timing, the address decoder 121 may provide a non-translated real memory address to the memory device 200.

The virtual memory address provided to the address translation table 131 may be translated into the real memory address which is mapped thereto. The translated real memory address may be provided to the memory device 200 using the address translation table 131.

Referring to FIG. 4, in the address translation table, the virtual memory address and the real memory address are related with each other. In the address translation table, a page number of the virtual memory address may be mapped to that of the real memory address. For example, a memory address may include a page number and an offset. The virtual memory address and the real memory address may be different from each other only in view of page number. Alternatively, the virtual memory address and the real memory address may be different from each other only in view of offset. According to an exemplary embodiment, the virtual memory address and the real memory address may be different from each other in view of both page number and offset.

Figure 5:
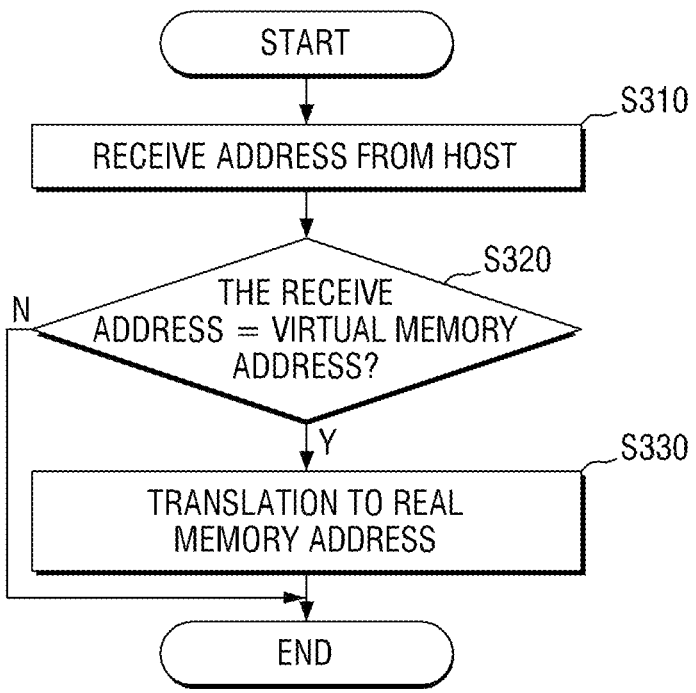
FIG. 5 is a flowchart illustrating an address translation operation of the memory device shown in FIG. 1.

FIG. 5 is a flowchart which illustrates an address translation operation of the memory device, shown in FIG. 1.

Referring to FIG. 5, the memory controller 100 shown in FIG. 1 receives a physical address from the host (S310). As described above, the physical address includes a virtual memory address and a real memory address.

Next, the memory controller 100 determines whether or not the received physical address is a virtual memory address (S320). In response to the received physical address being a virtual memory address, the memory controller 100 translates the virtual memory address into the real memory address which is mapped thereto (S330). The memory controller 100 may translate only the page number or the offset of the virtual memory address. According to exemplary embodiments, the memory controller 100 may translate both of the page number and the offset of the virtual memory address. Meanwhile, in response to the received physical address not being a virtual memory address but a real memory address, the memory controller 100 may not perform an address translation operation.

In response to the received physical address being a virtual memory address, the memory controller 100 may access the real memory space 202 using a translated real memory address. In response to the received physical address being a real memory address, the memory controller 100 may access the real memory space 202 using a non-translated real memory address.

Figure 6:
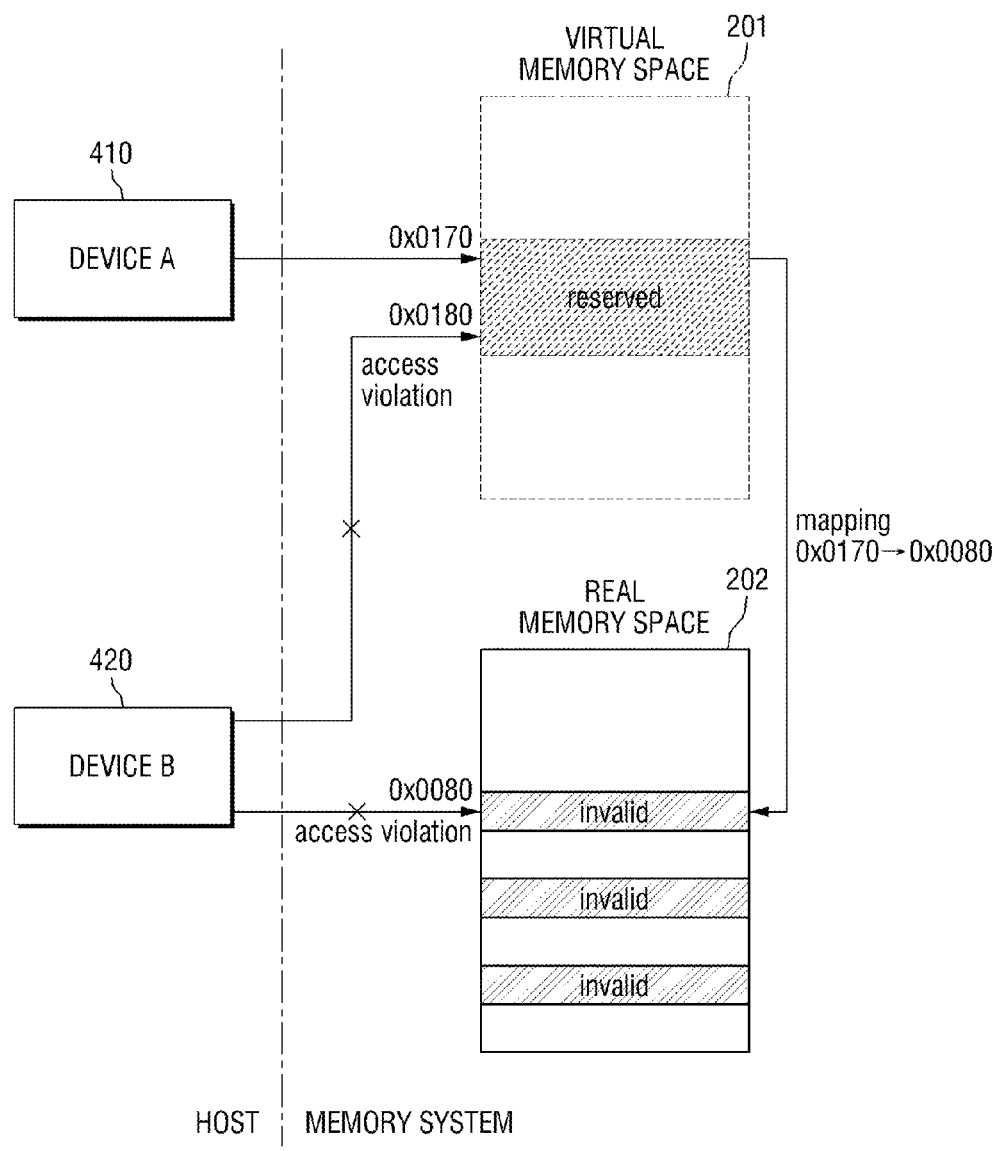
FIG. 6 illustrates an example of setting a reserved area in the virtual memory space shown in FIG. 2.

FIG. 6 illustrates an example of setting of a reserved area in the virtual memory space shown in FIG. 2.

Referring to FIG. 6, a reserved area is set in the virtual memory space 201 and a portion of the real memory space 202 is mapped to the reserved area. As described above, the reserved area of the virtual memory space 201 and a discontinuous area of the real memory space 202 are mapped to each other.

Only a first device 410 can access the reserved area and a second device (or another device) 420 is not allowed to access the reserved area. In addition, the second device 420 is not allowed to access the mapped portion of the real memory space 202, either.

For example, when the first device 410 accesses a 0x0170 page of the reserved area of the virtual memory space 201, a virtual memory address of the 0x0170 page may be translated into a real memory address of the 0x0080 page by the memory controller 100. In addition, the first device 410 actually accesses the real memory address of the 0x0080 page mapped to the virtual memory space of the 0x0170 page. However, since address translation is processed within the memory system 1, the first device 410 cannot recognize the address translation.

In order to access the reserved area of the virtual memory space 201, the first device 410 may provide an intrinsic encryption key. The first device 410 may provide the encryption key together with a virtual memory address. The memory controller 100 may permit the first device 410 to the reserved area of the virtual memory space 201 based on the encryption key.

For example, when the second device 420 accesses a 0x0080 page of the real memory space 202 mapped to the 0x0170 page of the virtual memory space 201, access violation may be generated by the memory controller 100 because an area of the real memory space 202 mapped to the reserved area is treated as an invalid area. In addition, when the second device 420 accesses a 0x0180 page of the reserved area of the virtual memory space 201, access violation may also be generated by the memory controller 100 because only the first device 201 can access the reserved area of the virtual memory space 201.

The first device 410 and the second device 420 may be positioned inside or outside the CPU, which is also applied to a case of a first application driven by the first device 410 and a second application driven by the second device 420.

Figure 7:
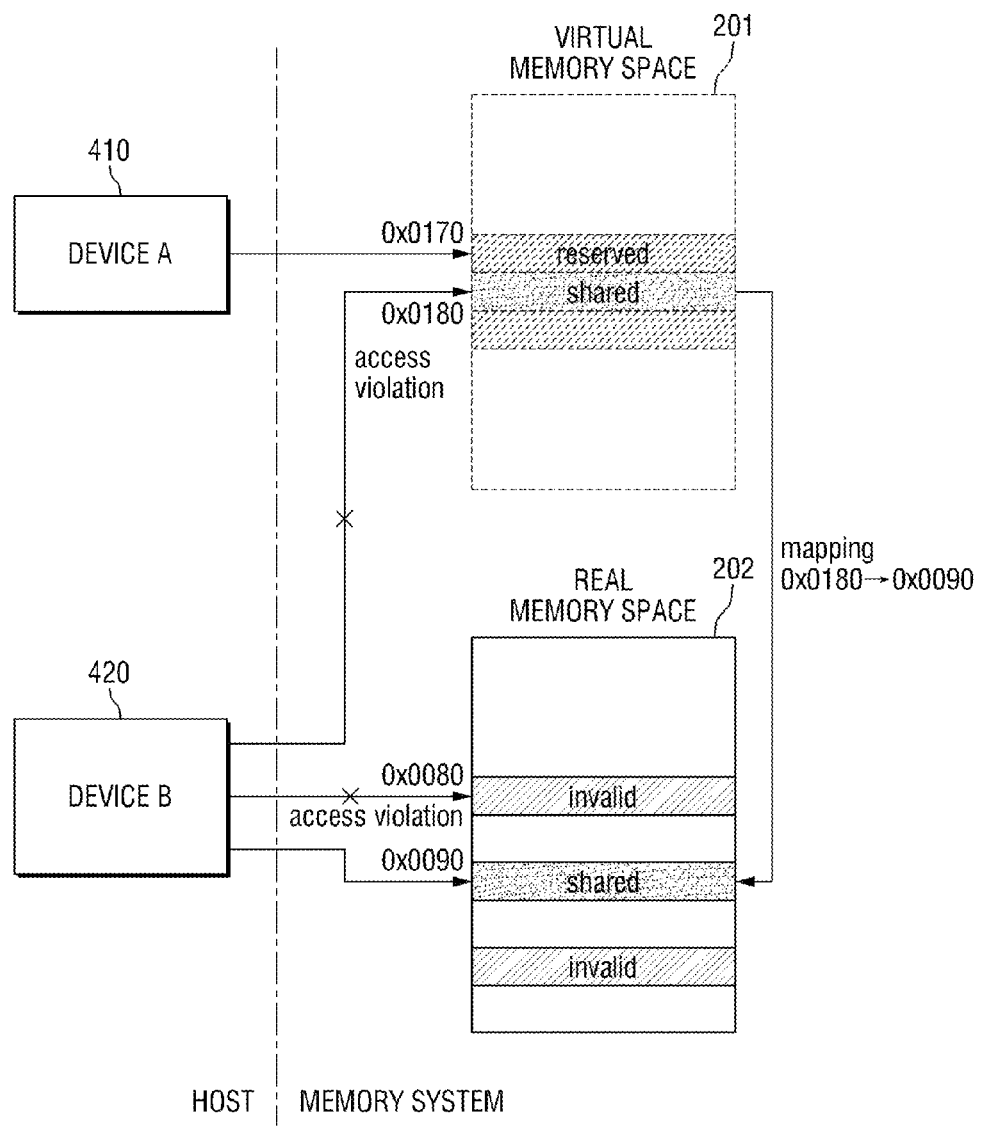
FIG. 7 illustrates an application example of setting a reserved area in the virtual memory space shown in FIG. 2.

FIG. 7 illustrates an application example of setting a reserved area in the virtual memory space shown in FIG. 2. For the sake of providing a convenient explanation, the following description will focus on differences from the example shown in FIG. 6.

Referring to FIG. 7, a portion in the reserved area of the virtual memory space 201 is set as a shared area. The second device 420 is not allowed to access the reserved area but is allowed to access an area of the real memory space 202 which is mapped to the shared area.

For example, when the second device 420 accesses a 0x0080 page of the shared area of the virtual memory space 201, as described in FIG. 6, an access violation may be generated by the memory controller 100. In addition, when the second device 420 accesses a 0x0080 page of the real memory space 202 mapped to the reserved area of the virtual memory space 201 (a portion other than the shared area), an access violation may also be generated by the memory controller 100. However, the second device 420 can access a 0x90 page of the real memory space 202 mapped to the 0x0180 page of the virtual memory space 201.

That is to say, the first device 410 and the second device 420 may share the portion of the real memory space 202 mapped to the shared area of the virtual memory space 201.

Figure 8:
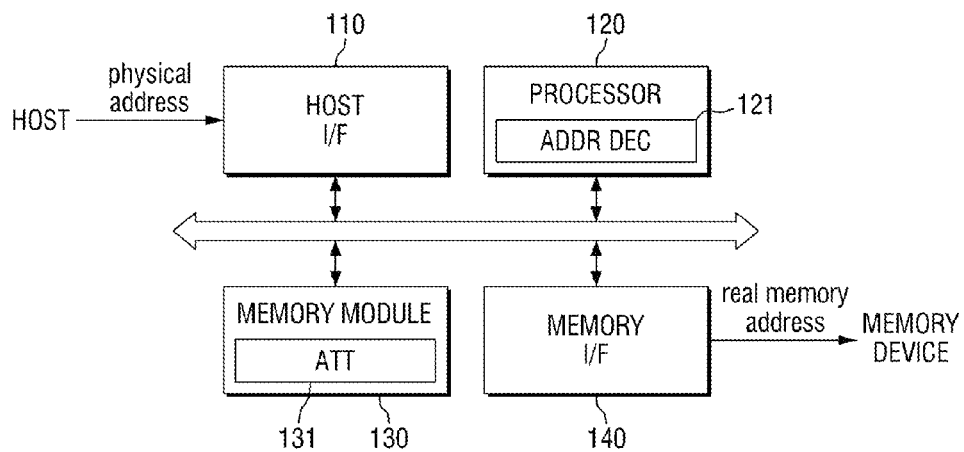
FIG. 8 is a block diagram illustrating a detailed configuration of the memory controller shown in FIG. 1.

FIG. 8 is a block diagram which illustrates a detailed configuration of the memory controller shown in FIG. 1.

In particular, referring to FIG. 8, the memory controller shown in FIG. 1 may include a host interface (I/F) 110, a processor 120, a memory module 130 and a memory interface (I/F) 140.

The host interface 110 may be configured to interface with the host. For example, the host interface 110 may receive a physical address from the host.

The processor 120 may be configured to control the operation of the memory controller 100. The processor 120, including the address decoder 121 shown in FIG. 3 as a functional component, may determine whether or not the received physical address is a virtual memory address.

The memory module 130 may operate as a working memory of the processor 120 and may be used as one of a cache memory or buffer memory between the host and a nonvolatile memory device. For example, the memory module 130 may be a static RAM (SRAM), but not limited thereto. The memory module 130 may include as a functional component the address translation table 131 shown in FIG. 3.

The memory interface 140 may be configured to interface with the memory device 200. For example, the memory interface 140 may provide a real memory address to the memory device 200. As described above, the real memory address may be a non-translated real memory address or a real memory address translated from a virtual memory address.

Alternatively, the memory controller 100 may further include other components not illustrated herein.

Figure 9:
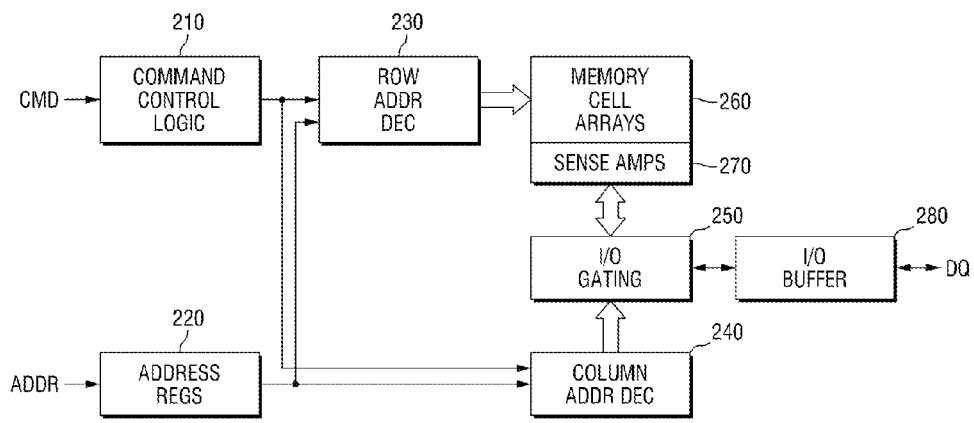
FIG. 9 is a block diagram illustrating a detailed configuration of the memory device shown in FIG. 1.

FIG. 9 is a block diagram which illustrates a detailed configuration of the memory device shown in FIG. 1.

In particular, referring to FIG. 9, the memory device 200 may include a command control logic 210, an address register 220, a row address decoder (ROW ADDR DEC) 230, a column address decoder (COLUMN ADDR DEC) 240, an input/output gating circuit (I/O GATING) 250, memory cell arrays 260, a sense amplifier (SENSE AMPS) 270 and an input/output (I/O) buffer 280.

The command control logic 210 receives a command CMD from the memory controller 100 and may control the operation of the memory device 200. For example, the command control logic 210 may decode the command CMD, including a write enable signal /WE, a row address strobe signal /RAS, a column address strobe signal /CAS, a chip select signal /CS, and so on, in order to generate control signals. The command control logic 210 may provide the control signals to the row address decoder 230 and the column address decoder 240 in order to control the memory device 200 to perform write, read or erase operations.

The address register 220 may receive the address ADDR from the memory controller 100. For example, the address register 220 may receive the address ADDR including a row address signal ROW_ADDR and a column address signal COL_ADDR. In addition, the address register 220 may receive a bank address signal BANK_ADDR. The address ADRR may be the above-described real memory address. As described above, the address ADDR may be a non-translated real memory address or a real memory address translated from a virtual memory address. The address register 220 may provide the received row address signal ROW_ADDR to the row address decoder 230 and may provide the received column address signal COL_ADDR to the column address decoder 240.

The row address decoder 230 may activate a word line of the memory cell array 260 corresponding to the row address signal ROW_ADDR. The column address decoder 240 which corresponds to the column address signal COL_ADDR may activate the sense amplifier 270 through the I/O gating 250.

The memory cell arrays 260 may include a plurality of memory cells storing data. The memory cell arrays 260 may include a plurality of word lines and a plurality of bit lines, and each of the plurality of memory cells may be connected to one word line and a bit line. The plurality of memory cells may constitute a plurality of memory blocks. The plurality of memory blocks may constitute a plurality of memory banks.

The I/O gating 250 may include write drivers for writing data to the memory cell arrays 260 and may include read latches for storing data read from the memory cell arrays 260 together with circuits for gating input/output data.

The I/O buffer 280 may receive data DQ to be written to the memory cell arrays 260 from the memory controller 100. The I/O buffer 280 may provide the data DQ, to be written to the memory cell arrays 260, to the memory cell arrays 260 through the write drivers. The data DQ read from the memory cell arrays 260 is sensed by the sense amplifier 270 and is then be stored in the read latches. The I/O buffer 280 may provide the data DQ stored in the read latches to the memory controller 100.

Alternatively, the memory device 200 may further include other components not illustrated herein.

Figure 10:
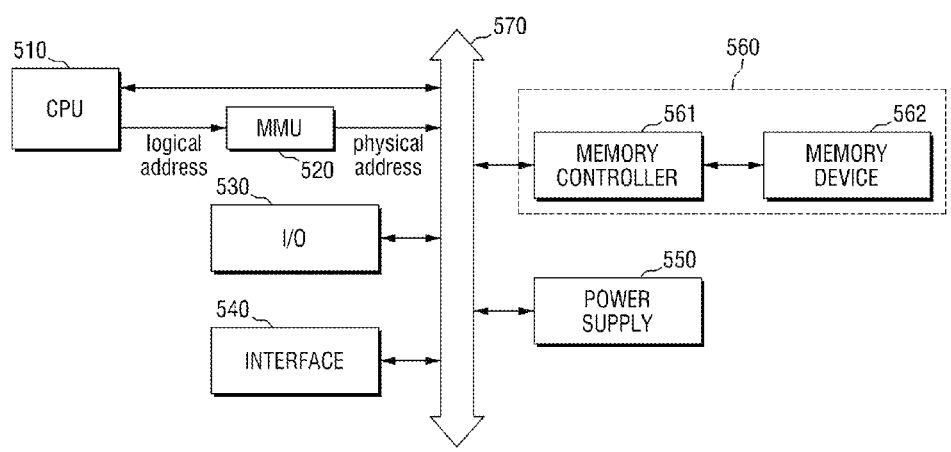
FIG. 10 is a block diagram of a computing system including the memory system shown in FIG. 1.

FIG. 10 is a block diagram of a computing system including the memory system shown in FIG. 1.

Referring to FIG. 10, the computing system 2 includes a central processing unit (CPU) 510, a memory management unit (MMU) 520, an input/output device (I/O) 530, an interface 540, a power supply 550 and a memory system 560.

The CPU 510, the MMU 520, the I/O 530, the interface 540, the power supply 550 and the memory system 560 may be connected to each other through bus 570. The bus 570 may correspond to a path through which data moves.

The CPU 510 may include a single processor core or multiple processor cores in order to process data. For example, the CPU 510 may include a multi-core, such as a dual-core, a quad-core, a hexa-core, or the like. The CPU 510 may further include various types of hardware devices (for example, an IP core). In addition, the CPU 510 may further include a cache memory positioned inside or outside the CPU 510.

The MMU 520 may receive a logical address from the CPU 510 and may translate the received logical address into a physical address. To this end, the MMU 520 may include logical addresses and physical addresses related with each other. As described above, the physical address may include a virtual memory address and a real memory address. The address translation operation of the MMU 520 may be performed on a page basis or on a segment basis.

The MMU 520 may further include a translation lookaside buffer (TLB) to achieve the address translation at a high speed. The TLB may store information related to the address translation that has recently been performed. In addition, the MMU 520 may perform various operations, such as data exchange with respect to the memory system 560 and/or protection of the memory system 560.

According to exemplary embodiments, the MMU 520 may be included in the CPU 510 as a component, and may be integrally formed with the CPU 510.

The I/O 530 may include one or more input devices, such as a keypad, or a touch screen, and/or one or more output devices, such as a speaker or a display device.

The interface 540 may perform wireless or wired communication with an external device. For example, the interface 540 may perform Ethernet communication, near field communication (NFC), radio frequency identification (RFID) communication, mobile telecommunication, memory card communication, universal serial bus (USB) communication, and so on.

The memory system 560 may store the data processed by the CPU 510 or may operate as a working memory of the CPU 510. The memory system 560 may include a memory controller 561 and a memory device 562. The memory controller 561 and the memory device 562 may be configured in substantially the same as the memory controller 100 and the memory device 200 shown in FIG. 1. For example, the memory device 562 may be a DRAM such as a double data rate static DRAM (DDR SDRAM), a single data rate SDRAM (SDR SDRAM), a low power DDR SDRAM (LPDDR SDRAM), a low power SDR SDRAM (LPSDR SDRAM), or a direct rambus DRAM (RDRAM), or an arbitrary volatile memory device.

The power supply 550 may convert externally applied power and then provide the converted power to various components 510 to 560.

Although not shown, the computing system 2 may further include a direct memory access (DMA) controller for controlling input/output of data. The DMA controller may transmit data between the memory system 560 and various other devices.

In addition, the computing system 2 may further include a nonvolatile memory device storing a boot image. For example, the nonvolatile memory device may include various types of nonvolatile memory devices, such as a read only memory (ROM), a programmable ROM (PROM), an electrically programmable ROM (EPROM), an electrically erasable programmable ROM (EEPROM), a flash memory, a phase change RAM (PRAM), a resistive RAM (RRAM) or a ferroelectric RAM (FRAM).

In various exemplary embodiments, the computing system 2 may be an arbitrary computing system, such as mobile phones, smart phones, personal digital assistants (PDAs), portable multimedia players (PMPs), digital cameras, music players, portable game consoles or navigation systems.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A memory system comprising:
   a memory device including a first memory space configured to be accessed using a first memory address and a second memory space configured to be accessed using a second memory address; and
   a memory controller configured to access the memory device,
   wherein the memory controller is configured to translate the first memory address into the second memory address mapped thereto in response to a request for access to the first memory space, access the second memory space using the translated second memory address, and access the second memory space using a non-translated second memory address, in response to a request for access to the second memory space,
   wherein a reserved area is set in the first memory space to which only a first device is accessible, and
   wherein the reserved area is a continuous reserved area that is mapped to a discontinuous area of the second memory space, and
   a shared area is set in the reserved area of the first memory space, a second device different from the first device can access a portion of the second memory space mapped to the shared area of the reserved area, and when the second device accesses a portion of the second memory space mapped to a portion other than the shared area of the reserved area, access violation is generated.

2. The memory system of claim 1, wherein the first memory space is a virtual memory space and the second memory space is a real memory space, the first memory space being mapped to at least a portion of the second memory space.

3. The memory system of claim 2, wherein the memory controller includes an address translation table in which the first memory address and the translated second memory address are configured to be related with each other.

4. The memory system of claim 1, wherein the memory controller is configured to receive a physical address from a host, and the physical address includes the first memory address and the second memory address.

5. The memory system of claim 4, wherein the memory controller includes an address decoder configured to determine whether the memory address received from the host is the first memory address or the second memory address.

6. The memory system of claim 1, wherein when a second device different from the first device accesses the reserved area of the first memory space, an access violation is generated.

7. The memory system of claim 1, wherein when a second device different from the first device accesses an area of the second memory space mapped to the reserved area of the first memory space, an access violation is generated.

8. The memory system of claim 1, wherein the reserved area of the first memory space is sequentially set, and the portion of the second memory space mapped to the reserved area is non-sequentially set.

9. A memory system comprising:
a memory device including a plurality of memory cells configured to store data; and
a memory controller configured to provide a physical address received from a host to the memory device,
wherein the memory controller is configured to translate the physical address at a first timing, provides the translated physical address to the memory device, and provides a non-translated physical address to the memory device at a second timing,
wherein the physical address is configured to includes a first memory address and a second memory address different from the first memory address, the memory controller is configured to translate the first memory address into the second memory address at the first timing and non-translates the second memory address which is different from the memory address at the second timing, and
a shared area is set in the reserved area of the first memory space, a second device different from the first device can access a portion of the second memory space mapped to the shared area of the reserved area, and when the second device accesses a portion of the second memory space mapped to a portion other than the shared area of the reserved area, access violation is generated.

10. The memory system of claim 9, wherein the memory device includes a virtual memory space accessed using the first memory address and a real memory space which corresponds to the plurality of memory cells and accessed using the second memory address.

11. The memory system of claim 10, wherein the first memory space is mapped to at least a portion of the second memory space.

12. The memory system of claim 10, wherein the memory controller includes an address translation table referenced when the physical address is translated at the first timing.

13. A memory system comprising:
a memory device including a first and second memory spaces, the first memory space being a virtual memory space and the second memory space being a real memory space; and
a memory controller configured to access the memory device,
wherein a reserved area is set in the virtual memory space and the reserved area is only accessible by an authorized host in response to a request to access the first memory space, and
wherein an unauthorized host is unable to access the reserved area of the virtual memory space, and
wherein the reserved area is a continuous reserved area that is mapped to a discontinuous area of the real memory space, and
a shared area is set in the reserved area of the first memory space, a second device different from the first device can access a portion of the second memory space mapped to the shared area of the reserved area, and when the second device accesses a portion of the second memory space mapped to a portion other than the shared area of the reserved area, access violation is generated.

14. The memory system of claim 13, wherein the virtual memory space is mapped to at least a portion of the real memory space by the memory controller.

15. The memory system of claim 13, wherein the virtual memory space is configured to be accessed by a first memory address and the real memory space is configured to be accessed by a second memory address.

16. The memory system of claim 15, wherein the memory controller is configured to translate the first memory address into the second memory address and the memory controller is configured to include an address translation table in which the first memory address and the translated second memory address are configured to be related with each other.

17. The memory system of claim 16, wherein the memory controller is configured to access the real memory space using the translated second memory address, and access the real memory space using a non-translated second memory address, in response to a request for access to the second memory space.

* * * * *